Patented Aug. 21, 1923.

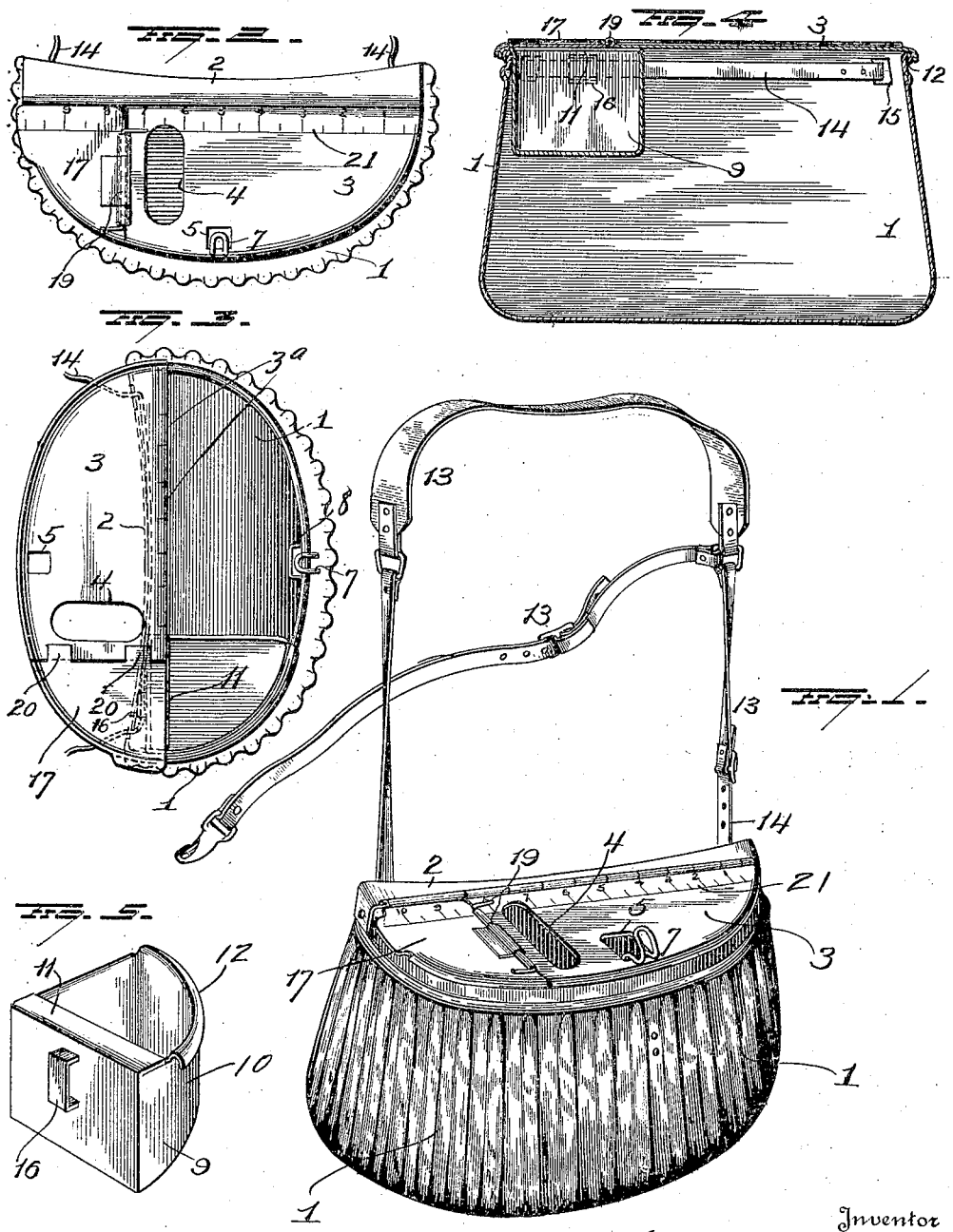

1,465,814

UNITED STATES PATENT OFFICE.

CHARLES M. FORSBURG, OF WILLIAMSPORT, PENNSYLVANIA.

FISH AND BAIT CARRIER.

Application filed September 6, 1922. Serial No. 586,508.

*To all whom it may concern:*

Be it known that I, CHARLES M. FORSBURG, a citizen of the United States, and a resident of Williamsport, in the county of Lycoming and State of Pennsylvania, have invented certain new and useful Improvements in Fish and Bait Carriers; and I do hereby declare the following to be a full, clear, and exact description of the invention, such as will enable others skilled in the art to which it appertains to make and use the same.

This invention relates to improvements in fish and bait carriers,—one object of the invention being to so construct a device of this character of metal that it shall be light in weight; easy to clean; so that the bait receptacle shall be firmly supported and yet be readily removable; so that access may be had to the bait receptacle without necessity of raising the entire cover of the carrier; so that the main closure and that for the bait receptacle shall be maintained normally closed, and so that said closures may be utilized to provide a rule for measuring fish.

With this and other objects in view, the invention consists in certain novel features of construction and combinations of parts as hereinafter set forth and pointed out in the claims.

In the accompanying drawings, Figure 1 is a perspective view illustrating my improved carrier. Figure 2 is a plan view of the device when closed. Figure 3 is a plan view showing the carrier open, Figure 4 is a sectional view and Figure 5 is a separate view of the bait receptacle.

My improved receptacle or carrier 1 is preferably constructed of light sheet metal having a convex corrugated front portion and a concaved rear portion. The upper end or mouth of the receptacle or carrier may be made somewhat smaller than the main body portion thereof and is provided with an inwardly projecting flange 2 having a straight inner edge to which a cover or closure 3 is hinged as at 3ª. This cover is provided with an elongated opening 4 which may be utilized for the insertion of fish and near its free edge, said cover may be provided with an opening 5 for the accommodation of a spring latch 7 secured within the body of the receptacle and limited in movement in one direction by a flanged plate 8 secured within the receptacle and limited in the other direction by engagement with the mouth portion of the receptacle or one end of the opening 5 in the cover.

A bait receptacle 9 is located in the upper part of the receptacle or carrier at one end thereof and has a curved wall 10 to conform to the contour of a portion of the wall of the receptacle or carrier and an inwardly projecting flange 11 which underlies the flange 2 of the receptacle or carrier 1. The curved wall 10 of the bait receptacle is provided with a flange 12 which engages over a portion of the wall of the receptacle or carrier 1 at the mouth thereof to afford simple and efficient supporting means for said bait receptacle. The carrier may be applied to the person of the user by means of a harness 13, one strap 14 of which passes through holes 15 in the rear wall of the carrier 1 and through a metal loop 16 on the bait receptacle. In the manner above described, the bait receptacle is retained in position within the main receptacle or carrier 1 but may be readily removed therefrom by releasing its flanged edge from the mouth portion of the carrier and loosening the strap 14, when it becomes necessary to clean said bait receptacle.

A separate cover 17 is provided for the bait receptacle and this cover is connected by a spring hinge 19 with one end of the main cover 3, and said cover 17 may be provided with limiting stops 20 to prevent said cover 17 from being swung over upon the main cover by the spring hinges, when in open position.

In order to meet the requirements of fish and game laws in many localities, I provide simple means whereby the fish may be measured and such means consists of a rule 21 graduated in inches, which may be stamped or pressed in the metal of the covers or closures 3 and 17.

Having fully described my invention what I claim as new and desire to secure by Letters Patent, is:

1. In a combined fish and bait carrier, the combination of a main or fish receptacle, a separate bait receptacle removably supported in one end portion of the main receptacle, a main cover hinged to said main receptacle, a separate cover for the bait receptacle, and a spring hinge connecting said last mentioned cover with one end of the main cover.

2. In a combined fish and bait carrier, the combination of a main receptacle, a bait receptacle therein provided with a flange removably engaging the main receptacle, a loop on another wall of the bait receptacle, and a strap passing through a wall of the main receptacle and through the loop on the bait receptacle.

In testimony whereof, I have signed this specification in the presence of two subscribing witnesses.

CHARLES M. FORSBURG.

Witnesses:
 E. W. COLE,
 JOS. A. LUNDQUIST.